US011993171B2

(12) United States Patent
Logvinov et al.

(10) Patent No.: US 11,993,171 B2
(45) Date of Patent: *May 28, 2024

(54) METHOD AND APPARATUS FOR CHARGING A BATTERY USING LOCAL POWER GRID TOPOLOGY INFORMATION

(71) Applicant: IoTecha Corp., Cranbury, NJ (US)

(72) Inventors: Oleg Logvinov, Asbury, NJ (US); Michael J. Macaluso, Jackson, NJ (US); Gadi Lenz, Zikhron Ya'aqov (IL)

(73) Assignee: IoTecha Corp., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,510

(22) Filed: Sep. 13, 2021

(65) Prior Publication Data

US 2021/0402889 A1 Dec. 30, 2021

Related U.S. Application Data

(63) Continuation of application No. 16/610,374, filed as application No. PCT/US2018/031140 on May 4, 2018, now Pat. No. 11,117,486.

(Continued)

(51) Int. Cl.
*B60L 53/66* (2019.01)
*B60L 50/60* (2019.01)
(Continued)

(52) U.S. Cl.
CPC ............ *B60L 53/66* (2019.02); *B60L 50/60* (2019.02); *B60L 53/51* (2019.02); *B60L 53/52* (2019.02);
(Continued)

(58) Field of Classification Search
CPC ......... B60L 53/62–64; B60L 53/66–68; B60L 2200/18; B60L 2240/72; H02J 7/00032
See application file for complete search history.

(56) References Cited

U.S. PATENT DOCUMENTS 11,117,486 B2 * 9/2021 Logvinov .............. B60L 53/67
2012/0259723 A1 * 10/2012 Ansari ................... B60L 53/63
705/26.1

(Continued)

FOREIGN PATENT DOCUMENTS

DE 102016119972 A1 * 5/2017 ............. B60L 53/64
EP 2404779 A1 1/2012
(Continued)

OTHER PUBLICATIONS

Machine translation of DE102016119972A1 (Year: 2022).*
(Continued)

*Primary Examiner* — David V Henze-Gongola
(74) *Attorney, Agent, or Firm* — NK Patent Law (57) ABSTRACT

An apparatus (240) and method for charging a plurality of mobile energy storage and power consumption devices (202) may control determining a power charging schedule for charging a battery of at least one of the devices (202), in accordance with charger availability information, transactive energy information, the current location of the one device, mobile energy storage and power consumption device information and information indicating predetermined timing for providing a predetermined minimum charge level at the device; and transmitting a charging instruction signal for charging the battery of the at least one device using electric power supplied from a distribution power grid (10, 204) or an alternative power resource (218), according to the power charging schedule.

20 Claims, 6 Drawing Sheets

Related U.S. Application Data (60) Provisional application No. 62/501,285, filed on May 4, 2017.

(51) Int. Cl.
  *B60L 53/51* (2019.01)
  *B60L 53/52* (2019.01)
  *B60L 53/62* (2019.01)
  *B60L 53/63* (2019.01)
  *B60L 53/64* (2019.01)
  *B60L 53/67* (2019.01)
  *B60L 53/68* (2019.01)
  *H02J 7/00* (2006.01)

(52) U.S. Cl.
  CPC .............. *B60L 53/62* (2019.02); *B60L 53/63* (2019.02); *B60L 53/64* (2019.02); *B60L 53/67* (2019.02); *B60L 53/68* (2019.02); *H02J 7/00032* (2020.01); *B60L 2200/18* (2013.01); *B60L 2240/72* (2013.01); *H02J 2300/24* (2020.01); *H02J 2300/28* (2020.01)

(56) References Cited

U.S. PATENT DOCUMENTS

| | | | |
|---|---|---|---|
| 2013/0054045 | A1 | 2/2013 | Ramezani et al. |
| 2013/0103378 | A1 | 4/2013 | Tinnakornsrisuphap et al. |
| 2013/0110296 | A1* | 5/2013 | Khoo ................... B60L 53/31 700/286 |
| 2013/0166081 | A1 | 6/2013 | Sanders et al. |
| 2013/0179061 | A1* | 7/2013 | Gadh ................... B60L 53/67 701/1 |
| 2013/0257372 | A1 | 10/2013 | Chen et al. |
| 2015/0367740 | A1 | 12/2015 | McGrath et al. |
| 2016/0332527 | A1 | 11/2016 | North et al. |
| 2019/0263285 | A1* | 8/2019 | Freitag ................ B60L 58/12 |

FOREIGN PATENT DOCUMENTS

| | | |
|---|---|---|
| EP | 2608146 A1 | 6/2013 |
| WO | 2017066790 A1 | 4/2017 |

OTHER PUBLICATIONS

International Search Report for PCT/US18/31140 dated Jul. 23, 2018, 13 pages.
Extended European Search Report for Application No. EP 18795061.3 dated Apr. 23, 2021, 13 pages.
EPO, Office Action for corresponding European Patent Application No. 18795061.3, dated Mar. 18, 2024, 12 pages.

* cited by examiner

METHOD AND APPARATUS FOR CHARGING A BATTERY USING LOCAL POWER GRID TOPOLOGY INFORMATION

CROSS-REFERENCE TO RELATED APPLICATIONS

This application is a continuation of U.S. patent application Ser. No. 16/610,374 filed Nov. 1, 2019, entitled "METHOD AND APPARATUS FOR CHARGING A BATTERY USING LOCAL POWER GRID TOPOLOGY INFORMATION," being issued as U.S. Pat. No. 11,117,486 on Sep. 14, 2021, which is a National Stage Entry of PCT/US18/31140 filed May 4, 2018, entitled "METHOD AND APPARATUS FOR CHARGING A BATTERY USING LOCAL POWER GRID TOPOLOGY INFORMATION," which claims priority to U.S. Provisional Patent Application No. 62/501,285 filed May 4, 2017, entitled "METHOD AND APPARATUS FOR CHARGING A BATTERY USING LOCAL POWER GRID TOPOLOGY INFORMATION". The disclosure of each of the aforementioned applications is incorporated herein by reference in their entireties.

TECHNICAL FIELD

The present disclosure generally relates to electric battery charging systems, and more particularly, determining schedules for charging electric batteries included in respective mobile apparatuses, such as electric vehicles (EV), using energy storage and power consumption related information for the mobile apparatuses, charging availability information for charging apparatuses on local electric power grids each supplied electric power from a distribution power grid, and transactive energy information indicating availability and pricing of electric power for supply to the respective power grids.

BACKGROUND

With the expected increase in the number of EVs in the near future, electric power charging requirements likely will increase. As a result, the existing electric power grid infrastructure, which includes utility power grids, distribution power grids and electric power grids at a residential or commercial level, may face challenges to satisfy the increased charging requirements.

In the future, the likely trend is that many EVs, for example, fleets of electric buses or trucks, may require significant charging infrastructure and corresponding power delivery capability. The EVs of such EV fleets, when requiring charging at the same or about the same time, in turn may present large loads to a local distribution system operator (DSO).

Figure 1:
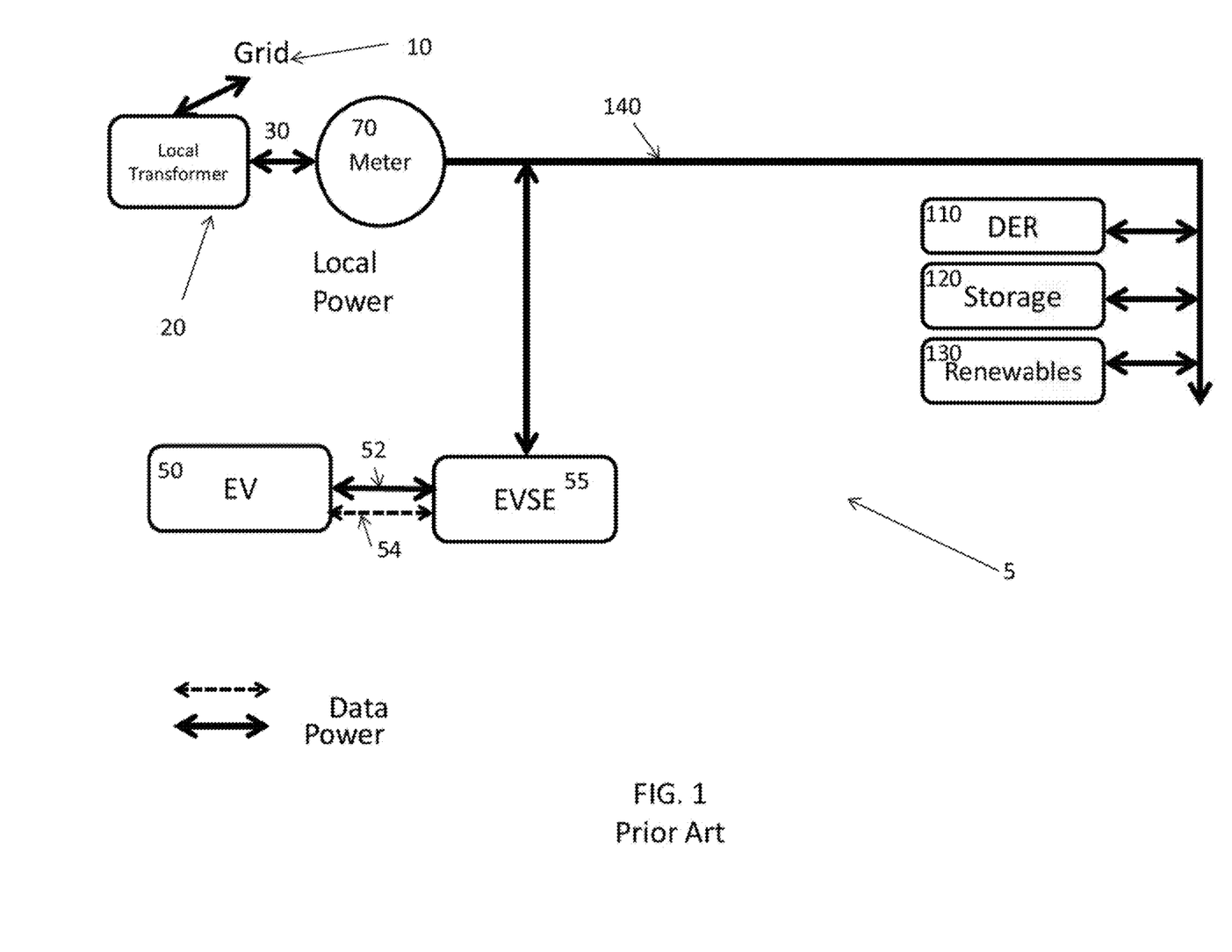
FIG. 1 is an illustration of a prior art residential electrical power system with a typical "dumb" electrical meter and "dumb" electric vehicle supply equipment (EVSE).

FIG. 1 illustrates a prior art electrical power system 5. Electrical power may be provided from Grid 10 via a local transformer 20 to powerline distribution wiring 30 which extends to an electrical meter 70. For ease of reference and as used in the present disclosure, "Grid" is the electrical power network which is upstream of the electrical meter at a low voltage transformer and may supply power to an electric power grid which extends on the load side of the transformer, and "local" refers to any power equipment connected to the secondary winding of the transformer, i.e., load side. The Grid 10 may include sub-sections of different power capacities and types of control and/or availability. The transformer 20 may reduce the voltage from a medium voltage to the standard low voltage wall outlet voltage of about 110 Volts line-to-ground or 220 Volts line-to-line. The electrical meter 70 may be "dumb", i.e., a device that does not make any decisions that affect charging or energy usage processes, which interconnects the wiring 30 to low voltage power distribution wiring 140. The system 5 may include electric vehicle supply equipment (EVSE) 55, which also does not make any decisions that affect charging or energy usage processes (i.e., a "dumb" EVSE), connected to the wiring 140. The EVSE 55 may include a power interface 52 to supply power to an EV 50, and a communication interface 54 over which EV power charging related information is exchanged with the EV 50. The system 5 may include alternative power resources such as a Distributed Energy Resource (DER) 110, an energy storage system 120 and a renewable energy resource (Renewable) 130. The energy storage system 120 may be embodied as a flywheel, molten salt, water tower, battery, pumped hydro or other energy storage system. The Renewable 130 may include a consumptive energy resource such as a wood-fired generator, a small nuclear generator, solar cells, solar panel array, wind turbine, water turbine, biomass system, geothermal system, etc. The DER 110 may include any Renewable 130 or energy storage system 120, and also may include an EV that may have spare energy in its batteries that can be shared or an EV engine that can be used to generate energy. The Grid 10 may be supplied electric power from a utility generator on the Grid 10, or a DER, Renewable or energy storage system which is a part of the Grid 10 or a local electrical power system, such as the system 5. In addition, the DER 110 and the Renewable 130 may contain a controller (not shown) that monitors electrical power output and synchronizes the supply of electrical power to the Grid 10 in order to supplement available energy on the Grid 10; directs energy of the DER 110 or the Renewable 130 to the energy storage system 120; and performs other power distribution functions as appropriate, such as load balancing and maintenance processes.

Figure 2:
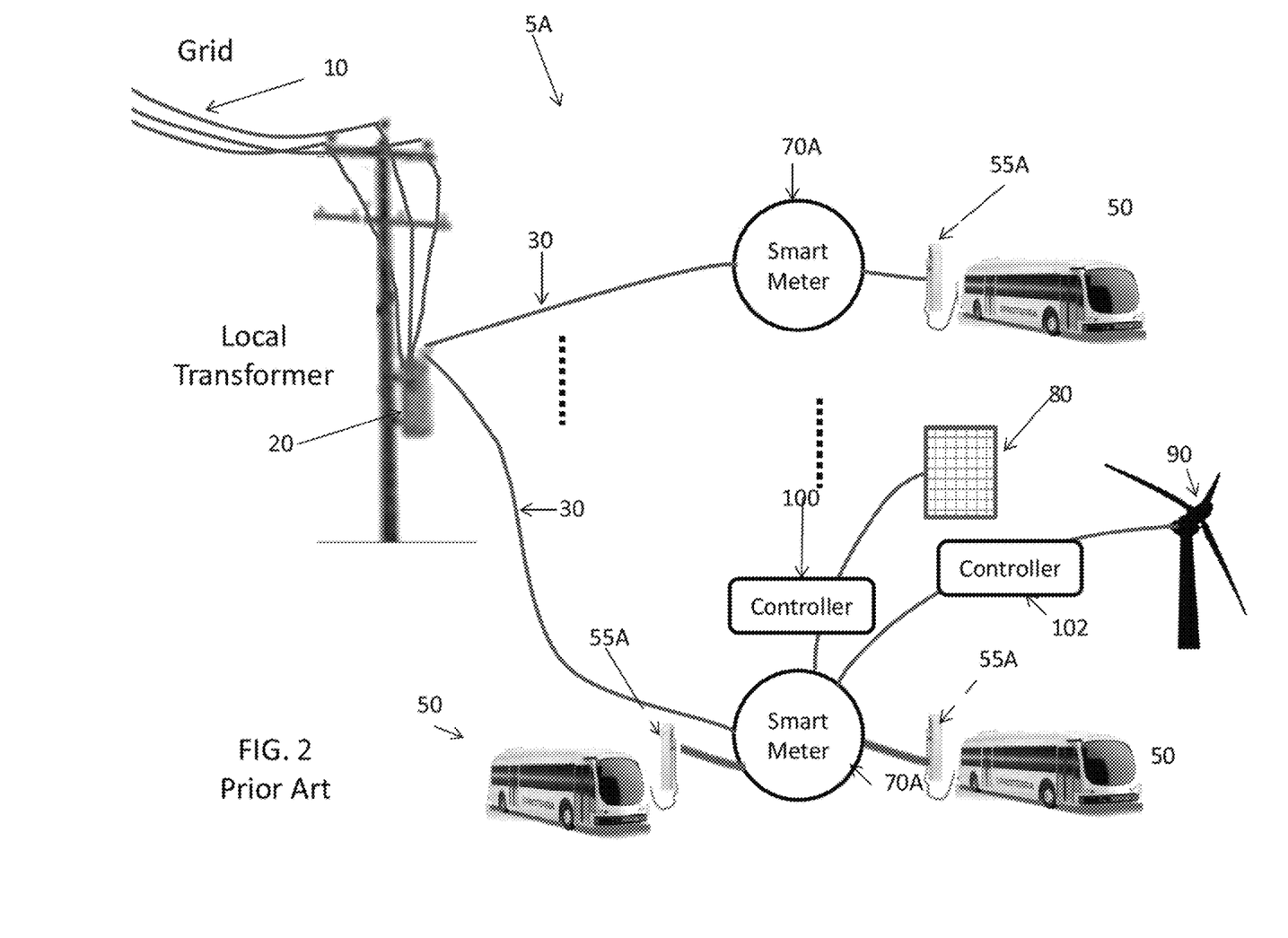
FIG. 2 is an illustration of a prior art residential electrical power system which includes smart EV charging apparatuses and smart electrical meters.

FIG. 2 illustrates a prior art electric power system 5A which is similar to the system 5, and includes smart devices. For purposes of the present disclosure, a "smart" device is a device capable of making a decision that affects charging or energy usage processes. In the power system 5A, utility electrical power may be distributed from the Grid 10 via the local transformer 20 to local customer premise distribution wiring 30 extending to smart meters 70A. The low voltage of the transformer is distributed up to the current and voltage capabilities of the transformer 20, the distribution wiring 30, and the load center of a facility (not shown) containing EVSEs and other power consumption devices (not shown). The facility may include a smart charger 55A configured to control charging of an EV 50, such as electric bus, and communication of EV power charging related information. The system 5A may further include controllers 100 and 102 of Renewables such as a solar panel array 80 and wind turbine 90, respectively, which may provide for communication of energy generation related information. The smart meter 70A may provide for exchange of energy generation and power consumption related information between the controllers 100, 102 and the Grid power distribution controller. Although energy generation and power consumption related information may be communicated among smart devices of the system 5A and the Grid controller, the charging needs of multiple EVs buses which are associated with each other, such as by being part of an EV bus fleet, and that may desire to use EV chargers of the system 5A for charging, are not considered at the smart devices of the system 5A or the Grid power distribution controller.

In addition, multiple electrical power systems similar to the system 5 or 5A may include chargers for charging EV buses of an EV bus fleet, where each system is associated with an electric power grid extending from a typical local step down transformer which is rated for less than 500 KVA. In the event simultaneous charging is desired for the batteries of multiple EV buses from the chargers wired to respectively selected specific local transformers, the power grids associated respectively with the selected local transformers may have insufficient capacity.

Accordingly, there exists a need for method, apparatus and system for charging a battery of multiple mobile energy storage and power consumption apparatuses, such as EVs, using power from a power distribution grid, efficiently, cost effectively and within the capabilities of one or more local electric power grids.

SUMMARY

In accordance with an aspect of the disclosure, a method may provide for charging a plurality of mobile energy storage and power consumption devices, wherein charging-related operations for each of the mobile energy storage and power consumption devices and for a plurality of charging apparatuses are associated with one another, wherein the charging apparatuses are on a plurality of microgrids or a single microgrid, wherein the microgrids respectively extend from different electric power distribution nodes of a distribution power grid or premises distribution network and are associated with respective geographic areas or areas of the premises distribution network, and wherein each of the microgrids or the single microgrid is configured to be supplied with a predetermined maximum power from the distribution power grid or the premises distribution network via the power distribution node corresponding thereto, the method comprising: controlling, by a processing device, at a power system control device, receiving, over a communication network, (i) mobile energy storage and power consumption device information indicating current energy storage level, current energy usage rate, current location and energy storage capacity respectively for the mobile energy storage and power consumption devices, (ii) charging availability information indicating current and expected charging operating status respectively for the charging apparatuses, and (iii) power resource information indicating availability and pricing of electric power for supply to the microgrids or the single microgrid from the distribution power grid or the premises distribution network; determining, for at least one first mobile energy storage and power consumption device of the mobile energy storage and consumption devices, based on the mobile energy storage and power consumption device information and information indicating predetermined timing for providing a predetermined minimum charge level at the at least one first mobile energy storage and power consumption device, at least one first power charging schedule for charging a battery of the at least one first mobile energy storage and power consumption device, in accordance with (i) the charging availability information, (ii) transactive energy information indicating pricing for supplying electric power from a given power source including at least one of the distribution power grid or an alternative power resource respectively to the microgrids or the single microgrid, and (iii) the current location of the at least one first mobile energy storage and power consumption device, in which the transactive energy information is determined based on the charging availability information and at least one of the power resource information or alternative power resource information indicating availability and pricing of electric power for supply to a given microgrid from the alternative power resource; and transmitting, over the communication network, a charging instruction signal for charging the battery of the at least one first mobile energy storage and power consumption device using electric power supplied from the at least one of the distribution power grid or the alternative power resource, according respectively to the at least one power charging schedule.

In accordance with an aspect of the disclosure, an apparatus may provide for charging a plurality of mobile energy storage and power consumption devices, wherein charging-related operations for each of the mobile energy storage and power consumption devices and for a plurality of charging apparatuses are associated with one another, wherein the charging apparatuses are on a plurality of microgrids or a single microgrid, wherein the microgrids respectively extend from different electric power distribution nodes of a distribution power grid or premises distribution network and are associated with respective geographic areas or areas of the premises distribution network, and wherein each of the microgrids or the single microgrid is configured to be supplied with a predetermined maximum power from the distribution power grid or the premises distribution network via the power distribution node corresponding thereto, the apparatus comprising: a processor and a memory including instructions which, when executed by the processor, control: receiving, over a communication network, (i) mobile energy storage and power consumption device information indicating current energy storage level, current energy usage rate, current location and energy storage capacity respectively for the mobile energy storage and power consumption devices, (ii) charging availability information indicating current and expected charging operating status respectively for the charging apparatuses, and (iii) power resource information indicating availability and pricing of electric power for supply to the microgrids or the single microgrid from the distribution power grid or the premises distribution network; determining, for at least one first mobile energy storage and power consumption device of the mobile energy storage and consumption devices, based on the mobile energy storage and power consumption device information and information indicating predetermined timing for providing a predetermined minimum charge level at the at least one first mobile energy storage and power consumption device, at least one first power charging schedule for charging a battery of the at least one first mobile energy storage and power consumption device, in accordance with (i) the charging availability information, (ii) transactive energy information indicating pricing for supplying electric power from a given power source including at least one of the distribution power grid or an alternative power resource respectively to the microgrids or the single microgrid, and (iii) the current location of the at least one first mobile energy storage and power consumption device, in which the transactive energy information is determined based on the charging availability information and at least one of the power resource information or alternative power resource information indicating availability and pricing of electric power for supply to a given microgrid from the alternative power resource; and transmitting, over the communication network, a charging instruction signal for charging the battery of the at least one first mobile energy storage and power consumption device using electric power supplied from the at least one of the distribution power grid or the alternative power resource, according respectively to the at least one power charging schedule.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

DETAILED DESCRIPTION

Overview

The technology of the present disclosure relates to, by way of example, a power system controller and method for controlling charging of one or more mobile energy storage and power consumption apparatuses, such as EVs, and in particular fleets of EVs, such as buses, which are associated with one another, such as by being a part of a bus fleet for which charging related operations may be performed according to a centralized control of the charging related operations for the EVs, in a power-constrained application of micro-electric power grids ("microgrid"), where a given microgrid, which may be at a same or different geographic location as another given microgird, may be associated with respective charging apparatuses whose charging related operations are associated with one another and controlled in common with the control of the EV charging related operations for the EV bus fleet, and where the charging apparatuses are for charging the EVs from power supplied from a power distribution grid or an alternative power resource, such as a DER, Renewable or Energy Storage system, of a customer premises distribution network which may include one or more microgrids, according to power charging schedules, respectively. For purposes of the present disclosure, a microgrid is electric power wiring, including power line and customer premises wiring, extending from a transformer which is downstream of an electric power meter which supplies electric power from the Grid. A single microgrid may exist downstream of the electric power meter, or multiple micogrids may extend from respective transformers, which are downstream of and extend from another transformer associated with the electric power meter through which electric power is supplied from the Grid to the multiple microgrids. The respective transformers may be respective power distribution nodes of a premises power distribution network which extends from the another transformer and includes the multiple microgrids.

For example, the typical EV bus fleet may have a large number of EV buses and a number of depots served by respective microgrids, and the fleets of EVs may be charged by charging apparatuses of the depots when the EVs are stored or arrive at the end of route to the depots. The power charging schedules for the respective EVs of the fleet may be determined using one or more of (i) current energy storage level, current energy usage rate, current location and energy storage capacity information from controllers of mobile power storage and power consumption devices associated respectively with the EVs, (ii) charging availability information indicating current and expected charging operating status respectively for the charging apparatuses, and (iii) power resource information indicating availability and pricing of electric power for supply to the microgrids from the distribution power grid or alternative power resources, such as a DER, Renewable and energy storage system, (iv) transactive energy information, such as from a transactive energy market, (v) information from Internet of Things (IoT) devices associated with users or others devices that may impact consumption of power on the microgrids, and (vi) information related to energy generation and power supply on a utility power grid (Grid) to which the microgrids may be selectively connected and disconnected.

In accordance with aspects of the present disclosure, power loads may be intelligently distributed over multiple depots that the EV fleet may own, where different ones of the depots are not tied to the same feeder, transformer or even the same substation of the power distribution grid, or tied to respective sub-transformers of a single microgrid, based on information on available energy generation and storage and power supply and consumption related information for EVs, charging apparatuses, the power distribution grid, microgrids and DERs, communicated over a communication network(s), which may provide an awareness of a local power grid topology and may be used to balance loads among the microgrids. Advantageously, the awareness of the local power grid topology may be used to recommend to fleet EVs (in near real time) to which depot to proceed for charging in order to maintain a favorable load balance among the microgrids. In embodiments of the present disclosure, local power grid topology may be used in combination with one or more of a Transactive Energy (TE) approach or a hierarchical optimization, to determine power charging schedules for multiple EVs of an EV fleet.

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with EV charging and an EV charging system have not been shown or described in detail to avoid unnecessarily obscuring descriptions of the embodiments.

Embodiments of the present disclosure are described generally with respect to a power system controller, which may be employed in various settings for charging multiple batteries of respective EVs which are associated with one another. Although the present disclosure uses EV battery charging as an example, it is to be understood that the aspects of the present disclosure may apply to any energy storage device such as capacitors; any electrical power source such as DERs, Renewables and EVs, as well as to other applications such as electric airplanes, electric motorcycles and the like so on.

In one embodiment, the charging schedule may identify an EV charging apparatus on a specific microgrid to be used for EV charging, timing of EV charging using the EV charging apparatus, and timing of storage of energy and generation of power from the stored energy for supply on the microgrid by one or more alternative power resources on the microgrid.

In accordance with an aspect of the present disclosure, the charging schedule for a specific EV of an EV fleet may be determined based on condition of the battery of the EV being charged, and local factors such as capabilities of an EV charging apparatus and constraints on the electrical power supply on the specific microgrid, such as, for example, whether other power consumption devices are active on the same specific microgrid.

In accordance with an aspect of the present disclosure, the charging schedule may be determined in accordance with external factors associated with multiple layers in a power distribution hierarchy. For example, the power distribution hierarchy may include a utility generator, high voltage distribution, low voltage distribution and local customer premise distribution, and external factors associated with the hierarchy may include public policy, tariffs, energy conservation programs, energy being used by other loads on the Grid (e.g., rolling brownouts), etc.

In accordance with an aspect of the present disclosure, the charging schedule may be determined based on transactive energy information which includes information relating to external factors for determining power distribution according to a Transactive Energy model. The Trans active Energy model may be an implementation of a financial model that weighs and analyzes various factors to create a market price and terms and conditions for the purchase of energy. For example, energy consuming devices and systems bid to buy energy, and energy producing devices and systems bid to sell energy. The market, based on the sum of all bids (both to sell and buy), may set a price ("clearing price"), where demand and supply are equal and this process may repeat itself every fixed period of time, such as every 5 minutes. In the Transactive Energy model, the energy demand may be generated by the "best" combination of central (e.g., utility power plant) and local DERs (e.g., solar cells). "Best" may mean a combination of many factors including lowest cost, lowest polluting, most efficient and other related technical and financial factors. These factors may be determined by a series of metrics, such as wire capacity, raw material cost (e.g., coal, gas, water), cost to convert the raw materials into power (e.g., labor, shipping, weather, and processing) and alternative energy availability (e.g., wind, water, solar and stored energy sources). In the Transactive Energy model, the market drives the control of energy consuming devices. In one embodiment, determination of a power charging schedule responsive to a need or request for charging the battery of an EV of the EV fleet may be in accordance with a willingness of an owner of EV fleet to pay a premium for the energy on an energy market.

As discussed in detail below, the technology of the present disclosure may incorporate transactive energy information related to the Transactive Energy model or similar processes into its capabilities and decision rules for determining power charging schedules respectively for the EVs of an EV fleet. The rules may use metric data to represent different factors that may be considered in determining the charging schedule. The metric data may be categorized into ranges of values, real-time analog and event signals, or any other data sets which represent information valuable to a decision process that intelligently determines a power charging schedule for EVs according to local power grid topology.

Example Systems

Figure 3:
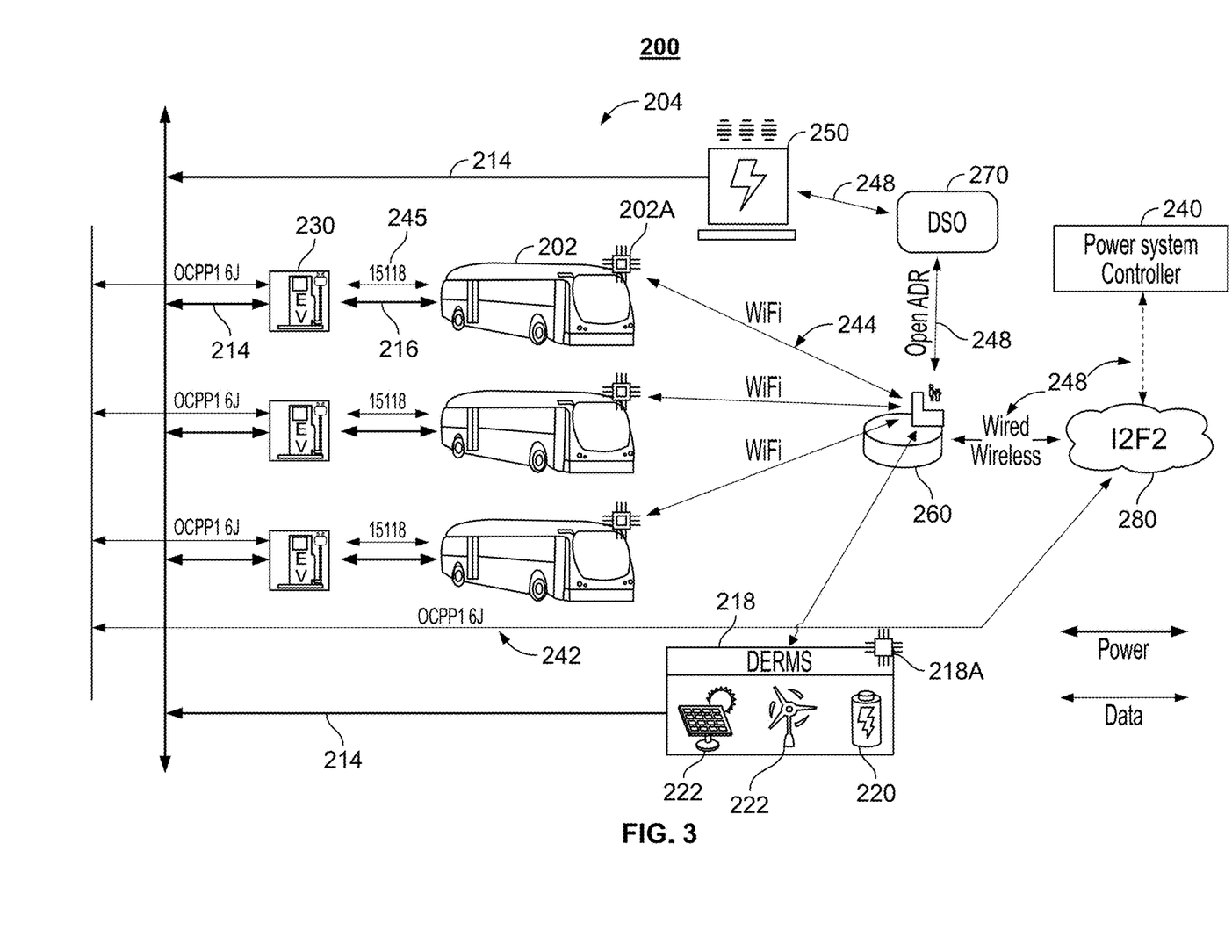
FIG. 3 is a block diagram of an exemplary electrical power control system, in accordance with aspects of the present disclosure.
Figure 4:
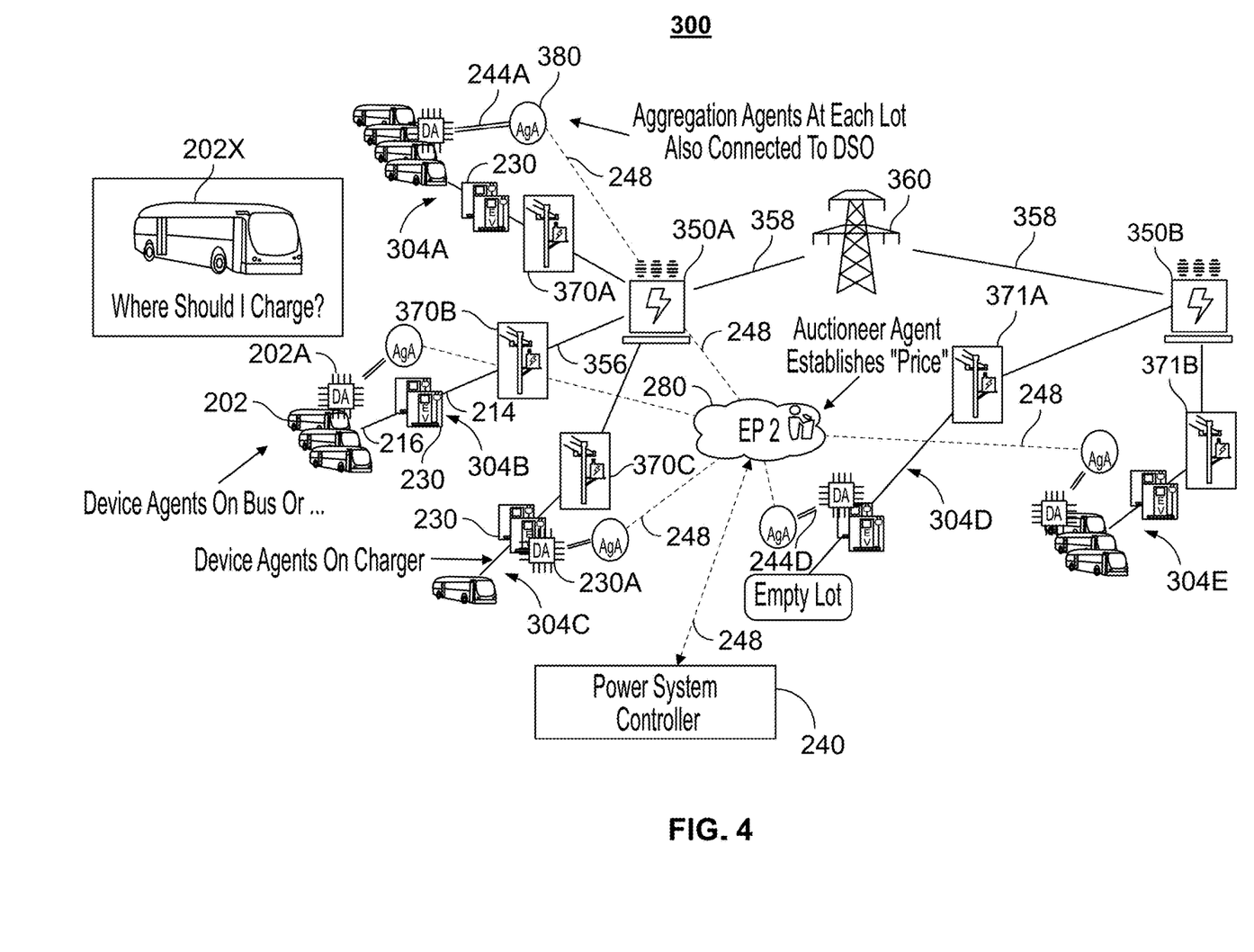
FIG. 4 is a block diagram of an exemplary electrical power control system, in accordance with aspects of the present disclosure.

FIG. 3 illustrates a block diagram of an exemplary electric power system 200. FIG. 4 illustrates a block diagram of another exemplary electric power system 300 including several of the same or similar components as included in the system 200.

Referring to FIG. 3, the system 200 may include a power system controller 240 configured to determine a power charging schedule for charging a battery of an EV 202 of a fleet of EVs 202 from a microgrid 204 using electric power supplied from the Grid or an alternative power resource 218 of the system 200, according to an aspect of the present disclosure. The system 200 may include, in addition to the power system controller 240, EV charging apparatuses 230 including respective controllers (not show), and the alternative power resource 218 may include a controller 218A, an energy storage system 220 and a Renewable 222. Feeder 250 may couple a power distribution grid or Grid (not shown) via a transformer and electric meter (not shown) to a low voltage powerline and electric power wiring 214, and include a controller (not shown) having a communication capabilities. The microgrid 204 of the system 200 may include the entirety of the wiring 214.

The wiring 214 may extend to the charging apparatuses 230 and the alternative power resource 218. Each EV charging apparatus 230 may include power interfaces respectively for coupling to the wiring 214 and wiring 216 configured for connection to an EV 202, and a communication interface (not shown). In addition, other power consumption devices (not shown) may be coupled to the microgrid 204.

The EV 202 may include a controller 202A implementing a software "device agent" (DA) as described in detail below. Further, the EV 202 may include location determination components (not shown), such as a GPS device, for generating location data indicating current location of the EV 202.

The controller of the charging apparatus 230, a controller 202A of the EV 202, the controller of the feeder 250 and the controller 218A may be communicatively coupled, over one or more communication networks, with the system controller 240 directly or indirectly, such as via a communication gateway 260 which is physically located at a geographic area of the microgrid 204. In one embodiment, the controller 202A may be communicatively coupled with the gateway 260 via a WIFI link 244, and with a controller of an EV charging apparatus by another communication link 245. In addition, the controllers of the EV charging apparatuses may be communicatively linked with a power data platform device 280 via a communication network 242. In addition, a distribution system operation (DSO) controller 270, which manages power distribution operations for the power distribution grid, may be communicatively coupled to the controller of the feeder 250 and the gateway 260 via a communication network 248. Further, the platform device 280 may be communicatively coupled to the power system controller 240 and the gateway 260 via the communication network 248.

In one embodiment, the communication network 242 may be a wired, wireless or powerline communication network that communicatively couples the charging apparatuses 230 to the internet or another communication network, such as a cloud communication network and where the gateway 260 is coupled to the cloud communication network. In some embodiments, when the network 242 is a powerline communication network, which may include a HOMEPLUG network or the like, components of the powerline communication network may determine power network topology information, for example, discover and identify locations of transformers in and power line branching of an electic power network, such as within a given microgrid or multiple microgrids extending from a transformer that supplies power from the Grid, for example, using technology as described in U.S. Pat. No. 6,917,888, incorporated by reference herein, and communicate the power network topology information to the gateway 260.

As indicated above, the microgrid 204 of the system 200 may include the entirety of the wiring 214. For ease of reference, in the present disclosure, any power supply, power consumption, energy generation or energy storage device supplying power to or supplied power from a powerline of an electric power grid, which may be the Grid or a microgrid, is referred to below as being "on the electric power grid" or "on the microgrid". In addition, a given EV 202 may be on an electric power grid, when a power charging schedule for charging a battery from the microgrid 204 identifies the given EV 202 for supplying power to or receiving power from the microgrid 204.

The controller 218A may implement a DA as described in detail below. Further, the gateway 260 may implement a software "auctioneer agent" (AA) as described in detail below.

The platform device 280 may be a computing device having a communication capabilities and that processes and analyzes power related consumption and storage information, as described in detail below.

Referring to FIG. 4, the exemplary electric power system 300 may include a plurality of microgrids 304, and include components similar to or the same as described for the system 200, such as EV charging apparatuses 230, alternative power resources (not shown) connected to a microgrid 304 and communication connections to a DSO (not shown) from controllers at power distribution nodes of a power distribution grid (Grid) (not shown). In the system 300, a substation 360 of the power distribution grid may be connected to feeders 350A and 350B via power lines 358, where the feeder 350A is connected to local transformers 370A, 370B and 370C via power lines 356, and microgrids 304A, 304B, 304C including powerlines and wiring 214 extend, respectively, from a load side of the local transformers 370A, 370B and 370C. The transformers 370B and 370C, for example, may be power distribution nodes of a premises distribution network extending from a transformer (not shown) between the feeder 350A and the transformers 370B and 370C. In some embodiments, the microgrids 304B and 304C corresponding to the respective power distribution nodes may be at a same or different geographic location. In addition, the feeder 350B may be connected to local transformers 371A and 371B via power lines 356, and microgrids 304D and 304E including powerlines and wiring 214 extend, respectively, from a load side of the local transformers 371A and 371B. In addition, one more of the EV charging apparatuses 230, such as the apparatuses 230 on the microgrid 304C, may include a controller 230A that implements a software DA. It is to be understood that a DA may be implemented at any charging apparatus and EV, in accordance with aspects of the disclosure.

Further, gateways 380, which may be physically located at the geographic area corresponding to the microgrids 304, respectively, may be communicatively linked with controllers 202A or controllers 230A via links 244A, and with the platform 280 and the controller of the feeder 350 via the communication network 248. The gateway 380 may implement a software "aggregation agent" (AgAS) which may perform the functions as described in detail below.

Figure 5:
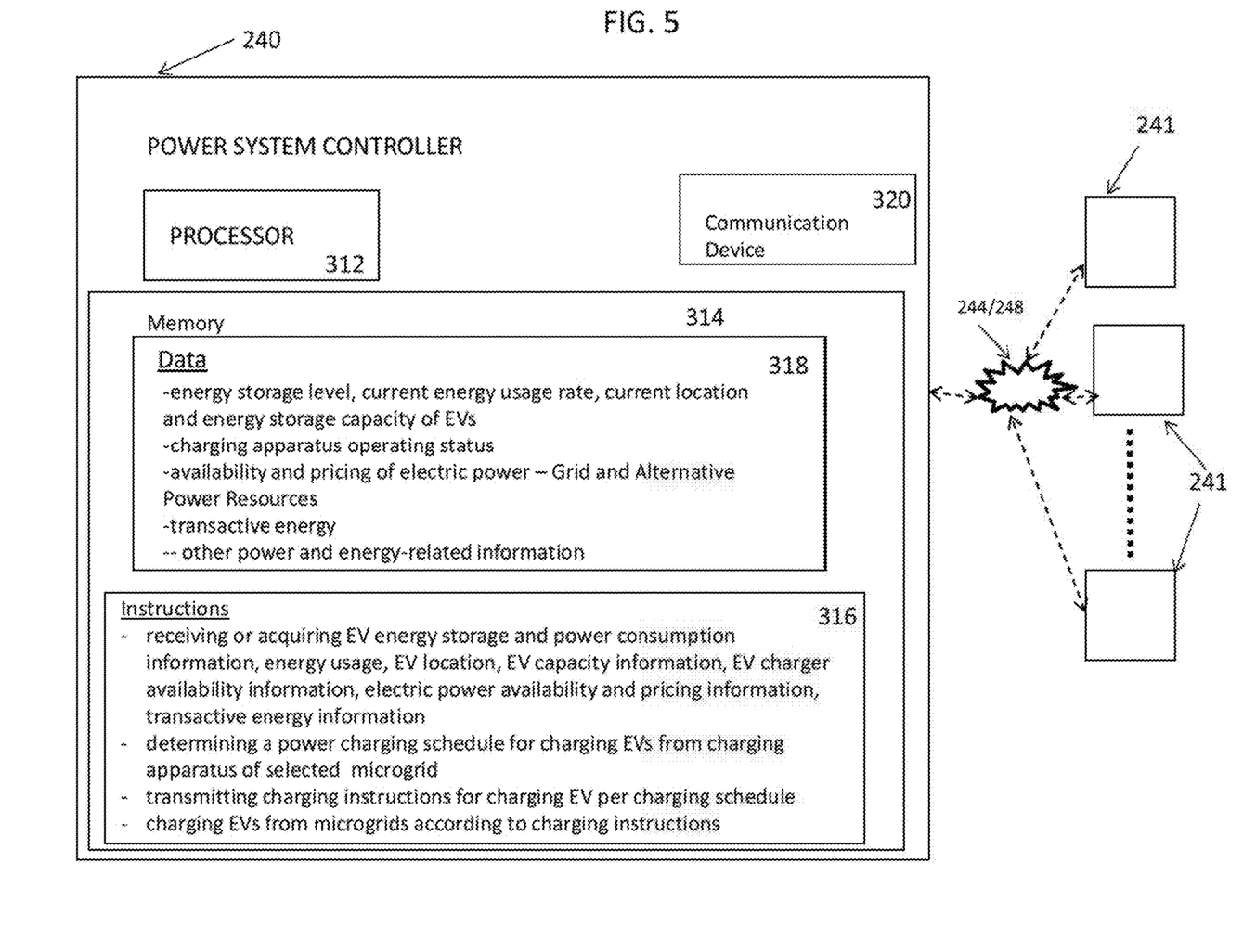
FIG. 5 is an illustration of a block diagram of an exemplary power system controller and computing devices of or associated with the power control system of FIG. 3 or 4, in accordance with aspects of the present disclosure.

FIG. 5 illustrates an exemplary embodiment of the power system controller 240 of the system 200 or 300. The controller 240 may be in the form of a computing device that includes one or more processors 312, one or more memory 314, and other components commonly found in computing devices.

The memory 314 may store information accessible by the one or more processors 312, including instructions 316 that may be executed by the one or more processors 312. Memory may also include data 318 that can be stored, manipulated, or retrieved by the processor. Such data 318 may also be used for executing the instructions 316 and/or for performing other functions. Such memory may be any type of non-transitory media readable by the one or more processors, such as a hard-drive, solid state hard-drive, memory card, ROM, RAM, DVD, CD-ROM, write-capable, read-only memories, etc.

The instructions 316 may be any set of instructions capable of being read and executed by the one or more processors 312. The instructions may be stored in a location separate from the computing device, such as in a network attached storage drive, or locally at the computing device. The terms "instructions," "functions," "application," "steps," and "programs" may be used interchangeably herein.

Data 318 may be stored, retrieved and/or modified by the one or more processors 312 in accordance with the instructions 316. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the controller 240 may include a communication device 320 configured to provide wired or wireless communication capabilities. The one or more processors 312 may be any type of processor, or more than one type of processor. For example, the one or more processors 312 may be CPUs from Intel, AMD, and Apple, or application specific integrated circuits (ASIC) or system on chips (SoCs).

FIG. 5 illustrates the components of the controller 240 as being single components, however, the components may actually comprise multiple processors, computers, computing devices, or memories that may or may not be stored within the same physical housing. For example, the memory may be a hard drive or other storage media located in housings different from that of the controller 240. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the power system controller 240 as described below may at least be partially performed at one or both of the gateway 260/380 and the platform device 280.

Referring to FIG. 5, the controller 240 may be configured to provide specific functions in accordance with embodiments of the present disclosure, and in some embodiments may be programmed with programs to perform some or all of the operations described herein. In some embodiments the controller 240 may be programmed to store, in the memory 314, information on energy storage level, current energy usage rate, current location and energy storage capacity of EVs 202; information on operating status of charging apparatuses 230; and information on availability and pricing of electric power for supply from or to the Grid or an alternative power resource. Also, the controller 240 may be programmed to store, in the memory 314, transactive energy data, information on time slots for charging and routes of EVs 202, and other energy and power related data that may be received from a component external to the system 200 or 300, such as over a communication network, which may include a power line communication network of power lines of the Grid or wiring or power lines of the microgrids. In addition, the controller 240 may store, in the memory 314, instructions for controlling: receiving or acquiring EV energy storage and power consumption, energy usage, EV location and EV storage capacity information; EV charger availability information; electric power availability and pricing information for the microgrids and alternative power resouces; and transactive energy information. In addition, the memory 314 may store instructions for controlling determining a power charging schedule for charging EVs from charging apparatuses of selected microgrid(s); transmitting charging instructions for charging EVs according to power charging schedules; and charging EVs from the selected microgrid(s) according to charging instructions.

Referring to FIG. 5, each of the controllers 202A, 218A and 230A, the gateways 260 and 380, and the platform device 380 of the systems 200 and 300 may be configured in the form of respective computing devices 241 similar to the controller 240, and include one or more processors, memory and instructions as described above. Each computing device 241 may be a personal computing device, such as intended for use by a user, and have all of the components normally used in connection with a personal computing device such as a central processing unit (CPU), memory (e.g., RAM and internal hard drives) storing data and instructions, a display (e.g., a monitor having a screen, a touch-screen, a projector, a television, or other device that is operable to display information), and a user input device (e.g., a mouse, keyboard, touch-screen, or microphone). Although not shown, the controller 240 may also include a display and a user input device.

Although each computing device 241 may comprise a full-sized personal computing device, each computing device 241 may alternatively comprise a mobile computing device capable of wirelessly exchanging data with a server, such as the controller 240, over a network, such as the Internet. By way of example only, a computing device 241 may be a mobile phone or a wireless device such as a wireless-enabled PDA, a tablet PC, a netbook or an IoT device. In another example, a computing device 241 may be a laptop computer.

Referring again to FIGS. 3-5, the gateways 260 and 380, each of the controllers 202A, 218A and 230A, the platform device 280 and the power system controller 240 may be communicatively connected with each other via a communication network, and/or may be directly connected to each other. The communication network may include interconnected protocols and systems. For example, the network may be implemented via the Internet, intranets, local area networks (LAN), wide area networks (WAN), etc. Communication protocols such as Ethernet, Wi-Fi, and HTTP, Bluetooth, LTE, 3G, 4G, Edge, etc., power line communication networks, such as HOMPLUG and the like, and various combinations of the foregoing may be used to allow nodes to communicate.

For example, the communication link 245 between the controller 202A of an EV 202 and a controller 230A of a charging apparatus 230 may be based on a PLC based standard (such as ISO/IEC 15118). Also, communication between the controller 202A of an EV 202 or the controller 230A of a charger apparatus 230 and the gateway 260 may be over WiFi link 244, and use an advanced protocol such as OCPP or future equivalent. The gateway 260 may be connected via communication network 248 to the Internet, a Cloud platform and the platform device 280, either via a direct wired connection or a wireless cellular connection, with a protocol such as OCPP or future equivalent. In additionally, each controller 202A of the EV 202 may have capability for wireless connection to the Internet via the communication network 248.

Each of the the gateway 260/380, each of the controllers 202A, 218A, and 230A, the platform device 280 and the power system controller 240 may be implemented by directly and/or indirectly communicating over a network, such as the networks 244 and 248 as shown in FIG. 5. In this regard, the gateways 260/380, the platform device 280, each of the controllers 202A, 218A and 230A and the power system controller 240 may be at different nodes of the networks 244/248 and capable of directly and indirectly communicating with other nodes of the network 244/248. As an example, each of the gateway 260/380, the platform device 280, each of the controllers 202A, 218A and 230A and the power system controller 240 may include web servers capable of communicating with another computing device via the network 244/248, and with a computing device external to the system 200 or 300 via the network 244/248. For example, the controller 240 may use the network 244/248 to transmit and present information to a user, such as a user of an EV 202 or an owner of the charging apparatuses 230 used to charge the fleet of EVs, on a display, such as displays respectively of controllers 202A and 230A.

In one embodiment, a smart meter may be installed at a transformer 370 or feeder 350 and be a power control device capable of measuring and controlling or helping to control, through messaging and signaling means, energy consumption (Grid to load of microgrids of the power system 200 or 300) and energy generation (load of the microgrids of the power system 200 or 300 to Grid), and may communicate with other components of the power system 200 or 300 to receive energy and power related information. In addition, the smart meter may operate to selectively connect the microgrid extending on the load side thereof to the Grid and disconnect (isolate) the microgrid from the Grid, for example, under control of the system controller 240.

The alternative power resources of the Renewable 222 may generate energy and output electrical power based on the generated energy, similar to Renewable 130 described above. In addition, the controller 218A may control transmitting energy generation and power output related information to the system controller 240; receiving control information from the system controller 240 for controlling the output of power therefrom; and managing, based on the control information, output of power to the microgrid associated therewith from the energy generated.

The storage system 220 may store energy which may be used to output electrical power, similarly as described above for the storage system 120. In addition, the controller 218A of the storage system 220 may control transmission of energy storage and power output information to the system controller 240; receiving control information from the system controller 240 for controlling storage of energy, such as from power output on the microgrid 204 (see FIG. 3) based on energy from Renewable 222; and receiving control information from the system controller 240 for controlling output of power to the microgrid 204 based on the stored energy of the system 220.

In accordance with one aspect of the present disclosure, the controller of an EV 202 may include a mobile app which a user of the EV may configure to allow access, by the controller 240, to various information, such as current location of EV, current route of EV, etc. In addition, the mobile app may communicate with the controller 240, or controllers 230A at the EV charging apparatuses 230, via a communication network, to receive notifications and charging instructions.

In accordance with aspects of the present disclosure, any of the controllers 202A, 218A and 230A, the gateway 260/380, the platform device 280 and a computing device external to the system 200 or 300, may be configured to perform all or a portion of the methods described herein, including all of the functions of the controller 240. For example, one or more computing devices may be configured to provide specific functions in accordance with embodiments of the technology. In this regard, one or more computing devices may maintain one or more storage devices, on which energy and power related data as well as other additional data used to control charging of a battery of an EV using a selected microgrid 304 of the system 300 (see FIG. 4), and to determine a power charging schedule for charging the battery of the EV 202 from the microgrid 304, may be stored.

Referring to FIGS. 3 and 4, it is to be understood that an electrical power system, such as the system 200 or 300, may include any number of communicatively connected computing devices 241 as controllers of respective power consumption, energy generation and energy storage components of the system, with each different computing device being at a different node of a communication network.

In accordance with an aspect of the present disclosure, the controller 240 may perform processing to decide how to charge multiple EVs 202 using power from selected microgrids of multiple electric power grids 304, or a single microgrid formed from a plurality sub-microgrids having respective charging apparatuses thereon, based on power grid topology information, to provide for distributing loads for charging over the selected microgrid(s) that balance loads on the microgrids extending from a power distribution grid and cost effectively charge the EVs 202 according to amount of charge and timing needed for charging. The processing may determine power charging schedules for the EVs, based on energy and power related information received over a communication network from controllers of the power system 200 or 300, and also energy and power related information from external the power system 200 or 300, such as from the Grid and controllers of EVs 202 that are not part of the system 200 or 300. The controller 240 may receive information about the physical, social and electrical environment, and EV fleet requirements, types of devices being charged and power capacity of the microgrids 304 and the power distribution grid, and process such information to determine a power charging schedule which is a best way to charge the fleet of EVs from the microgrids 304.

Example Methods

For purposes of illustrating the features of the present disclosure, an exemplary process for determining a power charging schedule for charging a battery of one more EVs 202 of a fleet of EVs using a selected microgrid(s) 304 of the system 300 as shown in FIG. 4, is described below in connection with operations performed at components of the power system controller 240.

Figure 6:
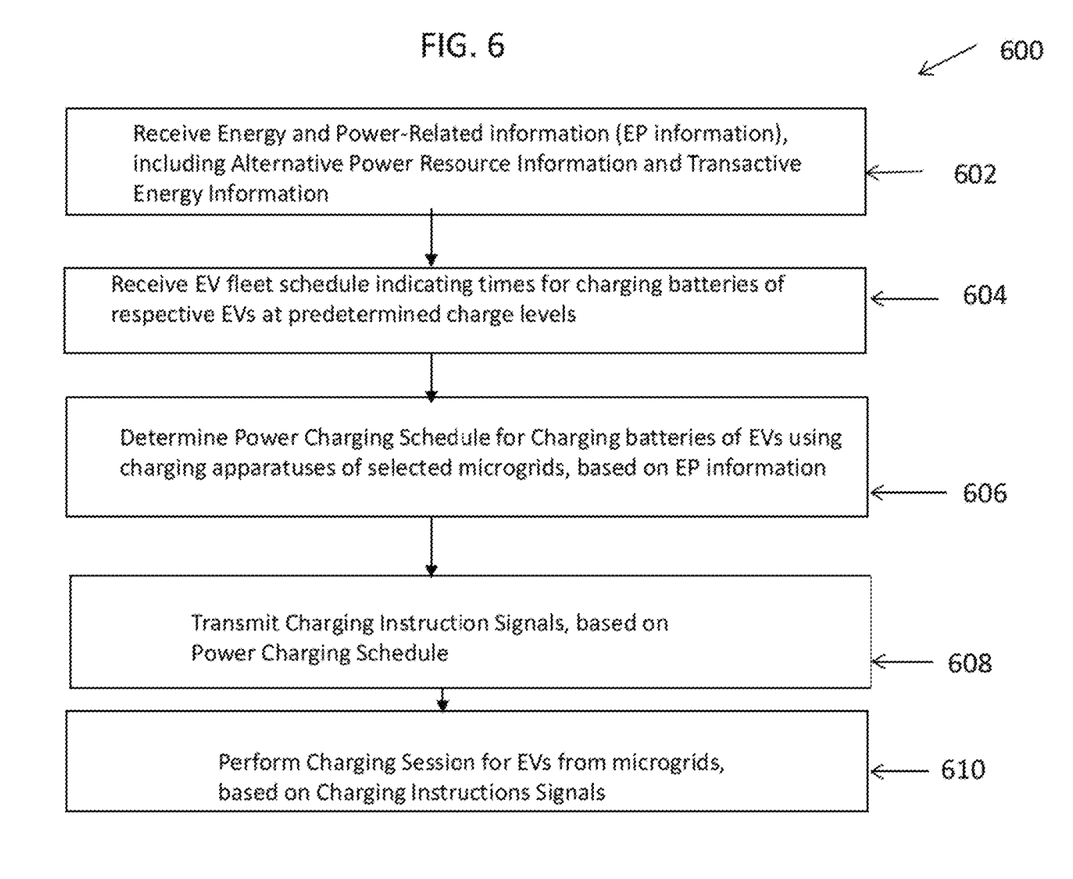
FIG. 6 is an exemplary high level flow diagram of a method for determining a power charging schedule for charging an EV using a selected microgrid, in accordance with aspects of the present disclosure.

Referring to FIG. 6, a high-level block diagram 600 of a method for charging batteries of respective EVs 202 using the charging apparatuses 302 of the microgrids 304 of the system 300 is illustrated.

In block 602, the controller 240 may receive, via one or more communication networks, from controllers 202A of respective EVs 202, energy storage and power consumption device information indicating current energy storage level, current energy usage rate, current location and energy storage capacity respectively for the EVs 202. In addition, the controller 240 may receive, via one or more communication networks, from controllers 230A of respective charging apparatuses 230, charging availability information indicating current and expected charging operating status respectively for the charging apparatuses 230. Further, the controller 240 may receive, via one or more communication networks, from a DSO 270 or other power information source device, power resource information indicating availability and pricing of electric power for supply to the microgrids 304 from the distribution power grid or alternative power resources on the microgrids 304. Also, the controller 240 may receive, via one or more communication networks, trans active energy information concerning the microgrids 304 and the power distribution grid (Grid).

In addition, the controller 240 may receive, over a communication network, information associated with devices on the microgrids 304 that may affect power consumption and energy generation and storage on the microgrids 304. For ease of reference, any energy and power related information which is received at the controller 240 and may be used to determine a power charging schedule for EVs 202 according to aspects of the present disclosure is referred to herein as EP information. In some embodiments, in block 602 the controller 240 may automatically continuously or periodically attempt to acquire desired EP information, over a communication network, from available sources of EP information.

In one embodiment, the EP information may indicate any other alternative power resources available for use at a microgrid, such as an EV 202 with a fully charged battery. In a further embodiment, the EP information may concern a power infrastructure specification of the Grid, feeder 350, transformer 370 and substation 360, such as current limits on transmission lines, transformer specifications that are not to be exceeded, and the like.

In one embodiment, the EP information may include alternative power resource information indicating time of availability and maximum power charging rate of a charging apparatus 230 associated with an alternative power resource, such as a Renewable 222 which is associated with an energy storage system 220.

In block 604, the controller 240 may receive, via a communication network, EV charging and timing information, such as bus route information for each EV 202 of the EV fleet, indicating a predetermined time at which a battery of an EV 202 needs to be charged to obtain a predetermined minimum charge level.

In one embodiment, the EP information may include information related to consumption of power at the EVs over time.

In block 606, the controller 240, using the EP information received in block 602, and other EP information that may be received in block 604, may determine a power charging schedule for each of one or more EVs 202, where each EV 202 is to be charged using power supplied from a charging apparatus 230 associated with a selected micorgrid 304 of the microgrids 304. The power charging schedule may be determined based on information indicating current energy storage level, current energy usage rate, current location and energy storage capacity of EVs that require charge within a predetermined time period using information indicating predetermined timing for providing a predetermined minimum charge level for the EVs. The power charging schedule may be determined in accordance with charging availability information for charging apparatuses 230 and transactive energy information indicating pricing for supplying electric power from the distribution power grid via a specific microgrid 304, or an alternative power resource associated with a corresponding microgrid, and the current location of the EVs that require charging within the predetermined time period.

In accordance with an aspect of the present disclosure, the controller 240 may be configured to self-organize the system 200 or 300 so that any power resources that form a power resource system providing for supply of power to a selected micorgrid are used effectively to provide full and reliable charging capability, according to a power charging schedule. For example, the system 300 may be configured, under control of the controller 240, to be self-organizing and capable of operating as a centralized and decentralized (distributed) system which implements "Islanding" of the system 300. Islanding is a controlled disconnection of a small self-sufficient microgrid from a main utility grid. For example, the controller 240 may self-organize the system 300 such that the microgrid 304B is isolated from the Grid, and a power resource system of the system 300, which does not include the Grid as a source of power for the microgrid 304B, may satisfy predetermined power consumption requirements of the EVs charging from charging apparatuses on the microgrid 304B.

In block 606, the controller 240 may apply metrics from a variety of types of EP information to make logical decisions within the power supply constraints of the microgrids 304 of the system 300 and the EP information available. In one embodiment, the power charging schedule may be determined such that the schedule satisfies an objective or rule for minimizing overall charging price, subject to a number of constraints, such as transformer power limits. In one embodiment, the power charging schedule may be in accordance with a charging process found in various standards, such as the ISO/IEC 15118 family of standards. In another embodiment, the power charging schedule may need to satisfy safety conditions for EV charging.

In one embodiment, the controller 240 may process EP information based on rules established to predict current and future likelihood for charging demand. In one embodiment, referring to FIG. 4, based on application of such rules, the controller 240 may determine a power charging schedule for, for example, EVs 202 having larger batteries at charging apparatuses associated with microgrid 304D, based on no other EVs being present at the bus depot which includes charging apparatuses of the microgrid 304D.

In one embodiment, the controller 240 may determine the schedule using alternative power resource information from the controller 218 of the alternative power resources 220 and 222, which may be associated with microgrid. For example, the controller 240 may determine whether alternative local energy is available which may provide cheaper and more renewable energy in place of or in addition to the utility power capabilities.

In another embodiment, the controller 240 may determine a power charging schedule for charging the EV 202 from a selected microgrid 304, relying upon combinations of metric data that are determined to be a desired or best combination of factors that ensure a desired result of lowest cost, fastest recharge rate, lowest pollution and most reliable energy source.

In another embodiment, the controller 240, based on the EP information available and various pre-configured rules, may determine a power charging schedule which provides that EV charging is performed at a lowest possible cost and carbon foot print.

In some embodiments, the controller 240 may use machine-learning-based analytics to learn behaviors of the EVs that may require charging from the microgrids 304 of the system 300, with respect to energy usage or power delivery. For example, busses of EV bus fleets may have regular routes and schedules, and the actual times, and the variation during the day or season may be learned and used to determine power charging schedules. In one embodiment, such data may be communicated by the power controller 240 to a controller of a power utility for use in forecasting power usage.

In one embodiment the controller 240 may use transactive energy information to determine the charging schedule. The transactive energy information may be based on results of energy consumers and producers submitting bids to buy and sell, respectively, a specific amount of energy for a certain price to an energy market, from which the clearing price is determined. The controller 240 may acquire information of the results of such bidding, including information indicating a user who accepts a clearing price, and determine a power charging schedule for an EV, based on those consumers who bid at or above the clearing price or accepted the clearing price. As the bid submission and acceptance of the clearing price may be repeated (typically every few minutes), the controller 240 may rely upon real-time pricing to determine a power charging schedule for EVs at microgrids of a power system.

In one embodiment, referring to FIGS. 3 and 4, the controllers 202A and 230A may execute software instructions that implement a DA that performs a process of bidding to buy or sell energy. In addition, the gateway 380 may execute software instructions that implement an AgAs that performs a process of aggregating bids from multiple DAs and accepting information of power supply constraints from a local power utility, such as received from DSO 270. Further, the gateway 260 or the platform device 280 in the systems 200 or 300, respectively, may execute software instructions that implement an AA that aggregates all bids from all AgAs and establishes a clearing price for supplying power, which is then distributed to all AgAs and from there to all DAs. This process may repeat periodically, such every few minutes.

In one embodiment, for example, if an EV is almost discharged to a point of damaging the battery, such EV may be given priority status to charge among multiple power charging schedules for respective EVs.

In one embodiment, the charging schedule may be based on a hierarchical aggregation used to implement a Virtual Power Plant (VPP) (i.e., a logical construct that represents a sum of decisions rather than a specific power plan). In this aggregation, transactive energy information related to a Transactive Energy model may be obtained, such that multiple bids from a set of power related devices or systems are collected and merged to determine a market clearing price, and a power charging schedule is determined using the market clearing price for a specified time period of charging. For example, in an exemplary embodiment, large numbers of EVs of the EV bus fleet that are temporarily not used and are in one or more depots associated with respective microgrids associated with the EV bus fleet may serve as pooled energy storage devices and represent a VPP that the DSO may use when needed. Similarly, the temporarily unused EVs in such depots may be used for local ancillary services providing, for example, frequency stabilization, voltage control, etc.

In another embodiment, the controller 240, alone or in combination with another computing device, may serve as an energy aggregation agent that manages multiple agents as energy generation and storage and power consumption devices, and act as a market or auctioneer agent to compute and publish a clearing price, over a communication network.

In one embodiment, the controller 240 may, from the EP information, determine current and anticipated load demand and capabilities, for determining a power charging schedule that provides sufficient power for the EV while avoiding overloading of the microgrids 304.

In block 608, the controller 240 may control transmission of a charging instruction signal for charging EVs 202 from selected microgrids 304, according to the power charging schedules. In one embodiment, charging instruction signals may be transmitted respectively to one or more of the components of the system 300 on the selected microgrids 304, and cause a controller 218A or controller 202A of an EV 202 to perform energy generation or storage, according to the power charging schedule. In one embodiment, the charging instruction signal may include a charging reservation indicating a specific EV charging apparatus 230 on a microgrid 304A at which to charge a specific EV 202 and a time period at which to charge the EV 202 at the EV charging apparatus 230 on the microgrid 304A, and respective charging instruction signals may be transmitted for reception by the respective controllers of the specific EV and the EV charging apparatuses of the microgrid 304A.

In a desired embodiment, the receiving information, determining power charging schedules, and transmitting charging instructions functions, such as described with respect to FIG. 6, are performed in real time or substantially real time.

In block 610, the controller 240 alone or in combination with one or more controllers of components of the system 200 or 300 may control charging one or more EVs 202 from one or more microgrids using a charging apparatus based on charging instruction signals transmitted.

In an exemplary implementation of the present disclosure, referring to FIG. 4, an EV 202X of a bus fleet of EVs 202 may have completed its route and need to return to a bus depot associated with a same entity that operates and is associated with the bus fleet to recharge. The EV 202X may have requirements, according to a bus schedule for the bus fleet, as to when to leave the depot and, therefore, the charging of its battery to provide sufficient stored energy at its battery to complete a next route of the EV 202X. The platform device 280 may receive information regarding physical connection of a given bus EV 202 to a charging apparatus via a first communication link from the EV 202 to the charging apparatus, and from the charging apparatus via a communication network, which may be OCPP 1.6J protocol. The first link may be be used to collect other information, such as how much energy an EV needs and what charging plan is selected by the EV, and may also include a unique Bus ID. The controller DAs on buses or charging apparatuses may bid to buy power, where a bid may indicate required power for a next time slot and price. As the DSO 270 operates the distribution power grid supplying power to the microgrids of the system 300, an amount of power being delivered to each of its feeders 350 and substations 360, is known at each instant. The DSO 270 may send, over a communication network, real-time EV information concerning power supply from the distribution power grid, and information on maximal capacities, transformer temperature limits, etc., of feeders, substations and transformers, to a gateway 380 acting as an AgAs.

The AgAs as the gateways 380 may aggregate all bids for charging at the respective depots, and the DAs at controllers of alternative power resources 281 may bid to sell power, where the bid indicates available power to sell for a next time slot and price. The AgAs may rely upon such information from the DSO, and aggregated bid information from the DA bids for power to charge EVs, and determine an aggregated bid which the gateway 380 may then send to the platform device 280 acting as an AA. It is to be understood that, in an alternative embodiment, the DSO 280 may send such information directly to the platform device 280. In one embodiment, if a depot is associated with a microgrid having an alternative power resource, such as solar panels on the depot roof, the alternative power resource may be included as a supply bidder and communicate such bids from the DA controller thereof to a local gateway 380.

In the exemplary implementation, some of the available depots associated respectively with the microgrids 304 may already be full and some or all of their charging apparatuses may be in use, and thus already be stressing the part of the distribution network feeding the bus depot in the geographic area associated with the corresponding grid. For example, the charging apparatuses in depots associated with the geographic area served by the microgrids 304A, 304B and 304C may all be in use, such that price of charging may be determined to be higher for such microgrids. In addition, a depot associated with the microgrid 304E may be full of buses but not necessarily charging, and a depot associated with microgrid 304D may be about empty (no charging apparatuses thereof being in use), but other users (e.g., homeowners) receiving power from the feeder 350B may be consuming power such that the local feeder is overstressed. Transactive energy information may reflect a topology of the local microgrids, which indicates the power being delivered at every instant for the grids 304.

The AA may establish, based on the transactive energy information, the clearing price (at which supply equals demand) and broadcast this price information to the AgAs, which may include prices established for supplying power from the distribution power grid to the microgrids 304 respectively. In turn, the AgAs at the gateway 380, collectively, may determine a power charging schedule for the EVs to allocate power to the charging apparatuses on selected ones of the microgrids based on bids. For example, lower occupancy depots may have access to more power and at a lower price, whereas depots having many buses which are connected to a feeder and/or transformer, etc., are power stressed, and thus may be associated with higher prices for supplying electric power from the microgrid corresponding thereto.

Returning to the exemplary implementation, the bus whose location is known from its reported GPS location information, for example, to the controller 240 via gateway 380 and DA controller 202, may receive instructions, which are included in an instruction signal transmitted from the gateway 380 according to the power charging schedule. The instruction signals may indicate the closest, lowest "price" depot for charging and the best route to arrive at the charging apparatus in such depot based on the current location of the EV.

In one embodiment, where, of an EV bus fleet, a first EV has a first battery close to fully charged and a second EV has a second battery less than half-charged, the first and second batteries having the same charge capacity and requiring a full charge for completing a respective next bus route, and real-time EP information for a first microgrid indicates a large capacity for supplying power for charging and for a second microgrid indicates a small capacity for supplying power for charging, where the first and second microgrids are supplied power from a same upstream transformer of the Grid, the power charging schedules may be determined to provide for charging of the first EV at a charging apparatus of the second microgrid and the second EV at a charging apparatus of the first microgrid and include information for directing the first and second EVs to a location of the charging apparatuses of the respective first and second microgrids. In this manner, the power charging schedules may be determined to provide for load balancing at the first and second microgrids.

In one embodiment, the DSO 270 may publish its day-ahead forecast to a cloud platform from which the computing device acting as an AA may establish baseline pricing for charging, from which a power charging schedule is determined.

In one embodiment, a first power charging schedule may indicate a first time for charging a storage device from energy of a battery of an EV 202 over a specific micorgrid and a second time after the first time for charging the battery of another EV 202 using power supplied from the storage device over the same microgrid.

In another embodiment, a first power charging schedule may indicate charging by a first charging apparatus 230 of a first micorgrid when a number of other charging apparatuses 230 of a microgrid are in use or to be used at a predetermined time exceeds by a predetermined value a number of charging apparatus of the first microgrid in use or to be used at the predetermined time. In a further embodiment, a location of a geographic area of the first microgrid is nearer to the current location of a first EV 202 than a location of the geographic area associated with a third microgrid having a substantially same number of charging apparatuses in use or to be used at the predetermined timing.

In one embodiment, the controller 240 may, based on EP information indicating charging and power usage by EVs of the fleet, determine energy usage behavioral patterns of energy usage for individual EVs of the fleet, which may include effects that season of the year has on energy usage, and provide information on such energy patterns, which may indicate faulty, inefficient or defective batteries of an EV, to a computing device of an EV fleet owner. In addition, the EV fleet owner advantageously may use such pattern information to determine more efficient charging techniques for EVs of the fleet, which may include adjusting bus routes of EVs.

In one embodiment, referring to FIG. 4 and FIG. 6, power resource information may be received by a power system controller over a powerline communication network that is communicatively coupled to charging apparatuses, such of the system 300, where the powerline communication network determines power network topology information by analyzing a powerline communication signal transmitted from a transmitter to a receiver and a result of the analyzing is combined with identities and locations of electric power components in at least one microgrid 304 of the microgrids 304, a premises distribution network or the distribution power grid, and where the network topology information is included in the power resource information.

In another embodiment, the power charging schedules for EVs of a fleet may be determined by hierarchical optimization, which does not include a bidding process. The hierarchical optimization, for example, may rely upon input conditions such as energy needed to charge a specific EV bus, time when the charge needs to be completed, and availability of power for charging at a charging apparatus of a depot associated with a specific microgrid, and optimize the data of the input conditions, such that, for example, charging of the battery of the EV from the charging apparatus in a first hour is 7 KW and in a second hour is 3 KW, which avoids stress on the transformer associated with the microgrid.

Most of the foregoing alternative examples are not mutually exclusive, but may be implemented in various combinations to achieve unique advantages. As these and other variations and combinations of the features discussed above may be utilized without departing from the subject matter defined by the paragraphs, the foregoing description of the embodiments should be taken by way of illustration rather than by way of limitation of the subject matter defined by the paragraphs. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the paragraphs to the specific examples; rather, the examples are intended to illustrate only one of many possible embodiments. Further, the same reference numbers in different drawings may identify the same or similar elements.

The invention claimed is:

1. A computer implemented method comprising:
receiving, over a communication network, charging availability information indicating current and expected charging operating status for a plurality of charging apparatuses configured to provide a Virtual Power Plant (VPP) using an electric vehicle (EV) fleet, wherein the plurality of charging apparatuses is located within a vehicle depot fed by a microgrid;
determining a first power charging schedule for charging a first EV of the EV fleet based on transactive energy information and using hierarchical aggregation for determining availability of the VPP, wherein:
the transactive energy information is determined based on charging availability information and alternative power resource information indicating availability and pricing of electric power for supply to the microgrid from an alternative power resource; and the hierarchical aggregation is a logical construct representing a sum of decisions;
and
transmitting, over the communication network, a charging instruction signal to a first charging apparatus of the plurality of charging apparatuses for charging the first EV of the EV fleet.

2. The computer implemented method of claim 1 further comprising receiving, over the communication network, power resource information indicating availability and pricing of electric power from a plurality of other microgrids associated with the microgrid.

3. The computer implemented method of claim 2, wherein the plurality of other microgrids extends from at least one of a distribution power grid and a premises distribution network.

4. The computer implemented method of claim 3, wherein the plurality of other microgrids extends from different electric power distribution nodes.

5. The computer implemented method of claim 2, wherein the transactive energy information is determined based on the charging availability information and the power resource information.

6. The computer implemented method of claim 2, wherein the first power charging schedule is determined for maintaining a load balance at the microgrid and the plurality of other microgrids.

7. The computer implemented method of claim 2, wherein first charging apparatus is determined by a smallest distance from a current location of the first EV of the EV fleet, and a lowest price for supply of electric power among the microgrid and the plurality of other microgrids.

8. The computer implemented method of claim 7, wherein the first power charging schedule indicates a predetermined route from the current location to a location of the first charging apparatus.

9. The computer implemented method of claim 2, wherein the transactive energy information is received over the communication network from an auctioning agent that establishes pricing for supply of electric power for the microgrid and the plurality of other microgrids.

10. The computer implemented method of claim 1, wherein the microgrid is associated with the alternative power resource.

11. The computer implemented method of claim 10, wherein the alternative power resource is a renewable energy resource.

12. The computer implemented method of claim 1 further comprising determining timing information for providing a predetermined charge level at the first EV of the EV fleet.

13. The computer implemented method of claim 12, wherein the timing information includes a bid price for charging the first EV of the EV fleet.

14. The computer implemented method of claim 1, wherein the first EV of the EV fleet is an EV bus and the EV fleet is an EV bus fleet.

15. The computer implemented method of claim 1, wherein charging-related operations for the first EV of the EV fleet of using the first charging apparatus are controlled in accordance with the charging instruction signal.

16. The computer implemented method of claim 1, wherein the charging availability information is received in near real-time over the communications network and the charging instruction signal is transmitted in near real-time over the communications network.

17. The computer implemented method of claim 1, wherein the transactive energy information is further determined from a transactive energy model.

18. The computer implemented method of claim 1, wherein at least a portion of the EV fleet when connected to at least a portion of the plurality of charging apparatuses is configured to provide local ancillary services including frequency stabilization and voltage control.

19. A computing device comprising:
a memory; and
at least one processor configured for:
receiving, over a communication network, charging availability information indicating current and expected charging operating status respectively for a plurality of charging apparatuses configured to provide a Virtual Power Plant (VPP) using an electric vehicle (EV) fleet, wherein the plurality of charging apparatuses is located within a vehicle depot fed by a microgrid;
determining a first power charging schedule for charging a first EV of the EV fleet based on transactive energy information and using hierarchical aggregation for determining availability of the VPP, wherein:
the transactive energy information is determined based on charging availability information and alternative power resource information indicating availability and pricing of electric power for supply to a given microgrid from an alternative power resource; and
the hierarchical aggregation is a logical construct representing a sum of decisions;
and
transmitting, over the communication network, a charging instruction signal to a first charging apparatus of the plurality of charging apparatuses for charging the first EV of the EV fleet mobile energy storage and power consumption device.

20. A non-transitory computer-readable storage medium, the non-transitory computer-readable storage medium storing instructions to be implemented on at least one computing device including at least one processor, the instructions when executed by the at least one processor cause the at least one computing device to perform a method, the method comprising:
receiving, over a communication network, charging availability information indicating current and expected charging operating status respectively for a plurality of charging apparatuses configured to provide a Virtual Power Plant (VPP) using an electric vehicle (EV) fleet, wherein the plurality of charging apparatuses is located within a vehicle depot fed by a microgrid;
determining a first power charging schedule for charging a first EV of the EV fleet based on transactive energy information and using hierarchical aggregation for determining availability of the VPP, wherein:
the transactive energy information is determined based on charging availability information and alternative power resource information indicating availability and pricing of electric power for supply to a given microgrid from an alternative power resource; and
the hierarchical aggregation is a logical construct representing a sum of decisions;
and
transmitting, over the communication network, a charging instruction signal to a first charging apparatus of the plurality of charging apparatuses for charging the first EV of the EV fleet.

* * * * *